United States Patent
Lee et al.

(10) Patent No.: US 10,733,764 B2
(45) Date of Patent: Aug. 4, 2020

(54) TEXTURE PROCESSING METHOD AND DEVICE

(71) Applicant: SAMSUNG ELECTRONICS CO., LTD., Suwon-si, Gyeonggi-do (KR)

(72) Inventors: Sang-Heon Lee, Hwaseong-si (KR); Yeon-Gon Cho, Hwaseong-si (KR); Soo-Jung Ryu, Hwaseong-si (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 228 days.

(21) Appl. No.: 15/622,927

(22) Filed: Jun. 14, 2017

(65) Prior Publication Data

US 2018/0144506 A1     May 24, 2018

(30) Foreign Application Priority Data

Nov. 18, 2016    (KR) ........................ 10-2016-0154448

(51) Int. Cl.
| | |
|---|---|
| *G06K 9/36* | (2006.01) |
| *G06K 9/46* | (2006.01) |
| *G06T 9/00* | (2006.01) |
| *G06T 1/20* | (2006.01) |
| *G06T 11/00* | (2006.01) |

(52) U.S. Cl.
CPC ................. *G06T 9/00* (2013.01); *G06T 1/20* (2013.01); *G06T 11/001* (2013.01)

(58) Field of Classification Search
CPC ...... H04N 19/117; H04N 19/132; G06T 9/00; G06T 11/001; G06T 7/40
See application file for complete search history.

(56) References Cited

U.S. PATENT DOCUMENTS

| | | | | |
|---|---|---|---|---|
| 5,880,737 A | * | 3/1999 | Griffin | ................. G06T 11/001 345/582 |
| 6,292,194 B1 | * | 9/2001 | Powell, III | ............ G06T 11/001 345/582 |

(Continued)

FOREIGN PATENT DOCUMENTS

| | | |
|---|---|---|
| EP | 2898689 | 7/2015 |
| KR | 10-2010-0077307 | 7/2010 |

(Continued)

OTHER PUBLICATIONS

Nazari et al., "Near-lossless Compression for High Frame Rate Videos", 6 pages.

(Continued)

*Primary Examiner* — Guillermo M Rivera-Martinez
(74) *Attorney, Agent, or Firm* — F. Chau & Associates, LLC

(57) ABSTRACT

A texture processing method and apparatus that obtains information about a first data loss amount that occurred during a texture compression process. A determination is made regarding a second data loss amount that allowable during a texture filtering process based on the obtained information regarding the first data loss amount. Texture filtering is then performed by using the second data loss amount. At least one processor determines the second data loss amount based on a difference between the third data loss amount and the first data loss amount.

18 Claims, 9 Drawing Sheets

(56) References Cited

U.S. PATENT DOCUMENTS

| | | | | |
|---|---|---|---|---|
| 7,061,500 | B1* | 6/2006 | Baldwin | G06T 1/60 345/582 |
| 7,995,649 | B2 | 8/2011 | Zuo et al. | |
| 8,253,758 | B2 | 8/2012 | Buchner | |
| 8,538,175 | B1* | 9/2013 | Epstein | H04N 19/20 382/232 |
| 2002/0075274 | A1* | 6/2002 | Walton | G06T 9/001 345/582 |
| 2003/0063084 | A1* | 4/2003 | Burke | G06T 9/001 345/419 |
| 2004/0179610 | A1* | 9/2004 | Lu | G06T 9/004 375/240.25 |
| 2005/0094003 | A1* | 5/2005 | Thorell | H04N 9/646 348/241 |
| 2007/0291141 | A1* | 12/2007 | Thorell | H04N 9/646 348/241 |
| 2009/0046207 | A1* | 2/2009 | Salvucci | G06T 9/001 348/663 |
| 2010/0309982 | A1* | 12/2010 | Le Floch | H04N 19/50 375/240.16 |
| 2012/0133666 | A1* | 5/2012 | Buchner | G06F 3/1407 345/587 |
| 2012/0201476 | A1* | 8/2012 | Carmel | H04N 19/176 382/239 |
| 2012/0281006 | A1* | 11/2012 | Nystad | H04N 19/90 345/582 |
| 2012/0281925 | A1* | 11/2012 | Nystad | H04N 19/90 382/232 |
| 2014/0079330 | A1 | 3/2014 | Zuo et al. | |
| 2014/0112391 | A1* | 4/2014 | Matsuo | H04N 19/139 375/240.16 |
| 2014/0132429 | A1* | 5/2014 | Scoville | H03M 7/30 341/87 |
| 2014/0152683 | A1* | 6/2014 | Nystad | G06T 1/60 345/582 |
| 2014/0173674 | A1* | 6/2014 | Wolman | H04N 21/25 725/116 |
| 2014/0244939 | A1* | 8/2014 | Kwon | G06F 12/0855 711/140 |
| 2014/0267283 | A1* | 9/2014 | Nystad | G06T 9/00 345/428 |
| 2015/0178032 | A1* | 6/2015 | Gantman | G06T 15/04 345/520 |
| 2015/0201176 | A1* | 7/2015 | Graziosi | H04N 13/111 348/43 |
| 2015/0379684 | A1 | 12/2015 | Ramani et al. | |
| 2016/0027145 | A1 | 1/2016 | Taylor et al. | |
| 2016/0267702 | A1* | 9/2016 | Nystad | G06T 15/04 |
| 2017/0221256 | A1* | 8/2017 | Maksymczuk | G06T 9/00 |
| 2017/0345207 | A1* | 11/2017 | Seiler | G06T 1/20 |
| 2018/0020223 | A1* | 1/2018 | King | H04N 19/34 |
| 2018/0068463 | A1* | 3/2018 | Risser | G06T 7/45 |
| 2018/0089091 | A1* | 3/2018 | Akenine-Moller | G06T 1/60 |
| 2019/0164314 | A1* | 5/2019 | Wang | G06F 17/18 |

FOREIGN PATENT DOCUMENTS

| | | |
|---|---|---|
| KR | 10-2014-0027040 | 3/2014 |
| KR | 10-2016-0001701 | 1/2016 |
| WO | 2014/044908 | 3/2014 |

OTHER PUBLICATIONS

Fenney, "Texture Compression using Low-Frequency Signal Modulation", Graphics Hardware, The Eurographics Association, 2003, 9 pages.

* cited by examiner

| TEXTURE FORMAT (310) | ALLOWED LOSS AMOUNT (320) |
|---|---|
| 8 bit NORM | 2 bits |
| 16 bit NORM | 3 bits |
| 16 bit Integer | 3 bits |
| 32 bit Float | 5 bits |

305

| TEXTURE FORMAT (310) | ALLOWED LOSS AMOUNT (320) |
|---|---|
| 8 bit NORM | 3 bits |
| 16 bit NORM | 4 bits |
| 16 bit Integer | 4 bits |
| 32 bit Float | 6 bits |

TEXTURE PROCESSING METHOD AND DEVICE

CROSS-REFERENCE TO RELATED APPLICATION

This application claims the benefit of Korean Patent Application No. 10-2016-0154448, filed on Nov. 18, 2016, in the Korean Intellectual Property Office, the disclosure of which is incorporated by reference herein.

1. TECHNICAL FIELD

The present disclosure relates to texture processing methods and devices.

2. DISCUSSION OF THE RELATED ART

Graphics processing may include arranging vertexes at designated locations of a screen and adding textures to objects that are determined according to the arranged vertexes. A texture unit reads texture information corresponding to each point from a memory and adds texture to an object. In this regard, a texture coordinate in a memory corresponding to an arbitrarily designated point on a space may be expressed as a decimal point, and thus a process of interpolating adjacent points is performed. This process is referred to as texture sampling or texture filtering.

Texture used in graphics processing may be determined in advance and stored in a memory, but texture also may be generated in real time. Such texture generated in real time during graphics processing is referred to as dynamic texture. Dynamic texture may be compressed before being stored in a memory to reduce a memory bandwidth and power consumed to read/write the dynamic texture.

The above-described texture filtering and compression are independent processes, and optimization is performed during each process. Thus, it may be challenging to achieve the precision enhancement of images and also reduce power consumption.

SUMMARY

The inventive concept disclosed herein provides texture processing methods and devices.

The inventive concept will be disclosed in part in the following description that will be appreciated by a person of ordinary skill in the art, or may be learned by practice of the presented exemplary embodiments.

According to an exemplary embodiment of the inventive concept, a texture processing method performed by a computing system includes obtaining information about a first data loss amount that occurred during a texture compression process; determining a second data loss amount allowable (e.g. permissible) during a texture filtering process based on the obtained information; and performing texture filtering by using the second data loss amount.

According to an exemplary embodiment of the inventive concept, a computing system that processes texture includes at least one memory; and at least one processor, wherein the at least one processor obtains information about a first data loss amount that occurred during a texture compression process, determines a second data loss amount allowable during a texture filtering process based on the obtained information, and performs texture filtering by using the second data loss amount.

BRIEF DESCRIPTION OF THE DRAWINGS

The inventive concept will become apparent and more readily appreciated from the following description of the exemplary embodiments, taken in conjunction with the accompanying drawings in which:

FIG. 3 is a diagram of examples of loss tables according to an exemplary embodiment of the inventive concept;

DETAILED DESCRIPTION

Figure 1:
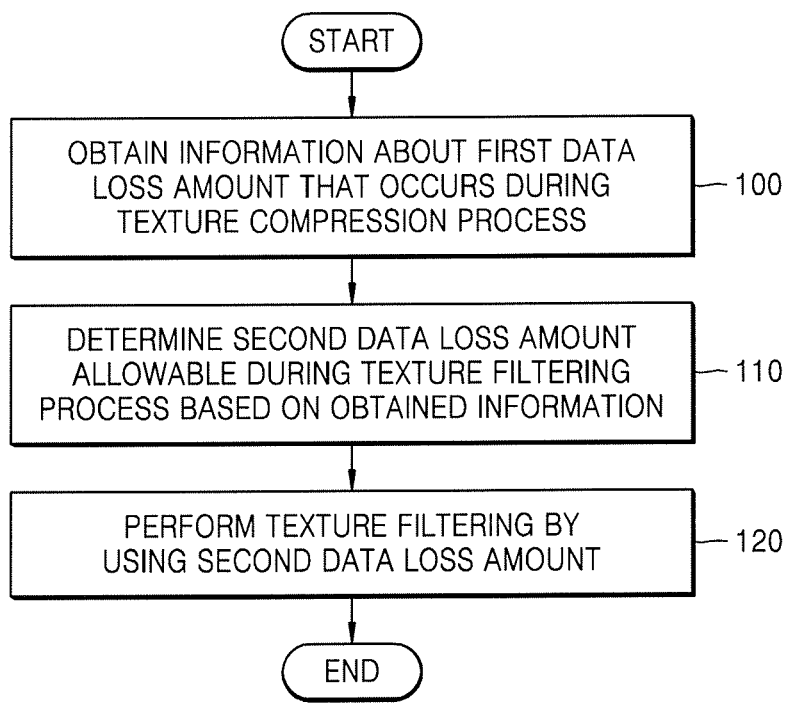
FIG. 1 is a flowchart of an example of a texture processing method according to an exemplary embodiment of the inventive concept.

Reference will now be made in detail to at least one exemplary embodiment of the inventive concept, examples of which are illustrated in the accompanying drawings, wherein like reference numerals refer to like elements throughout. In this regard, the present exemplary embodiments may have different forms and should not be construed as being limited to from shown and described herein. Accordingly, the exemplary embodiments are described below, by referring to the figures, to assist a person of ordinary skill in the art to understand the present inventive concept. As used herein, expressions such as 'at least one of,' when preceding a list of elements, modifies the entire list of elements and may not modify the individual elements of the list.

As used herein, the terms 'comprise' and/or 'comprising' specify the presence of stated features, integers, steps, operations, elements, and/or components, but do not preclude the presence or addition of one or more other features, integers, steps, operations, elements, components, and/or groups thereof.

It will be further understood that, although the terms 'first', 'second', 'third,' etc., may be used herein to describe various elements, components, regions, layers and/or sections, these elements, components, regions, layers and/or sections should not be limited by these terms. These terms are used to distinguish one element, component, region, layer or section from another region, layer or section.

Exemplary embodiments of the inventive concept set forth herein are related to texture processing methods and devices, and known features may not described in detail below so as not to obscure an artisan's appreciation of the inventive concept.

FIG. 1 is a flowchart of an example of a texture processing method according to an exemplary embodiment of the inventive concept. In this example, the texture processing method includes a texture compression process and a texture filtering process. The aforementioned operations of the texture processing method may both result in some data loss of a content. This data loss occurs by removing information that is of lesser importance, or does not adversely impact a subsequent retrieval and use of the data.

Referring to FIG. 1, in operation 100, a computing system may obtain information about a first data loss amount that occurs during a texture compression process.

The computing system may include various types of devices having a graphics processing function for displaying content. In addition, the computing system may include a graphics processing unit and a graphics pipeline. A compression algorithm may be used during texture processing.

For example, some non-limiting examples of the computing system may include a desktop computer, a laptop computer, a smart phone, a personal digital assistant (PDA), a mobile media player, a video game console, a television (TV) set-top box, a tablet device, an e-book reader, a wearable device, a head mounted display (HMD) device, etc. but is not limited to the aforementioned devices. In particular, mobile/tablet devices may have a higher optimization demand than, for example, desktop devices during texture processing because mobile/table device may have limited memory size and fewer processing resources. For example, the mobile/tablet devices can quickly expend their batteries and thus may reduce power consumed during texture processing while maintaining precision of an image corresponding to processed texture.

As discussed in this application, texture may refer to an image added to a 3D object on a 3D image during a process of rendering the 3D object as a 2D image that is to be displayed. Texture may include information about a detailed shape of an object, a surface texture, its color, etc. Texture may be compressed and stored in a memory in advance but may be generated in real time during a graphics processing process.

For example, texture corresponding to an image reflected on a mirror may be difficult to be generated in advance and stored. Under such circumstances, the advance generation of texture may strain available resources. Therefore, some textures may be generated in real time during a graphics processing operation. The texture generated in real time during a graphics processing process may be referred to as dynamic texture.

The computing system may compress dynamic texture prior to storing the dynamic texture in the memory. If the texture is compressed before being stored, then a memory bandwidth and a power consumed to read/write the texture may be reduced. However, during the texture compression process data loss may occur. For example, in the case of compressing images/graphics, compression algorithms are often designed to permit up to a certain amount of data loss that may not be discerned when the image is viewed by a casual observer.

If an amount of data loss that occurs during the texture compression process is considered a first data loss amount, the computing system may be configured to obtain information about the first data loss amount. The information about the first data loss may in turn be used to determine how much data loss will be permitted in one or more additional operations.

The first data loss amount may be expressed in various ways. For example, the first data loss may be identified for a first compression module, or for an aggregate amount of data loss by multiple compression modules. Also, the range of the data loss may be determined to quantize the first data loss amount. As an example, a loss amount with respect to a single texture compression unit may be referred to as the first data loss amount. As another example, an accumulated loss amount of a preset quantity of texture compression units also may be referred to as the first data loss amount. A texture compression unit may be determined based on a cacheline size.

If a range for determining the first data loss amount is determined as described above, a loss amount corresponding to the range may be expressed. As an example, the loss amount may be expressed as a peak signal to noise ratio (PSNR). For another example, the loss amount may be expressed in a root-mean-square error (RMSE), or a normalized mean square error (NMSE). As yet another example, the first data loss amount may be calculated by taking into account hardware costs. As will be described with reference to FIG. 2 herein below, when compression a allowing loss (e.g. lossy compression) corresponding to some lower bits is performed, the allowed loss amount may be the first data loss amount.

A texture loss compression method may be used obtain compressibility that is higher than a non-loss (e.g. lossless) compression method. A size of compressed data may be reduced because of an increase in the compressibility, and thus power consumed to read/write the compressed data from/to a memory may be reduced. Also, the computing system may utilize various compression methods when performing loss compression rather than when performing non-loss compression.

However, if there is a substantial increase in a data loss amount that occurs during the texture compression process, the precision of an image corresponding to texture may deteriorate to a level that may be noticeable to a user. Thus, a reference for a loss amount allowed (e.g. an allowable/permissible amount of data loss) may be used during the texture compression process.

There are additional data loss amounts that may be considered, for example, a second data loss amount (e.g. in a texture filtering operation discussed hereinafter) and a third data loss amount. In an embodiment of the inventive concept, the data loss can be expressed as ranges. In an addition, the amounts of data loss may be considered to be thresholds.

For example, the computing system may receive information about a third data loss amount that is allowed during texture processing. Since human eyes do not sense an error below a certain degree when viewing the image corresponding to the texture, there may not be a significant problem due to a certain amount of data loss occurring during texture processing. If a data loss amount allowed during texture processing is determined to be the third data loss amount, the computing system may receive the information about the third data loss amount.

The computing system may receive the third data loss amount from an external processor or driver but the inventive concept is not limited thereto. For example, the computing system may determine the third data loss amount by itself. Also, the computing system may obtain the information about the third data loss amount based on a user input.

The computing system may compress texture information based on an occurrence of data loss that does not exceed the third data loss amount. The computing system may compress texture by using various compression methods having an accompanying data loss that does not exceed the third data loss amount, and the computing system may select a compression method that causes the least data loss amount from the compression methods.

A size of an image that may be displayed after a compression operation may also be a factor into a data loss amount that display screen.

Figure 2:
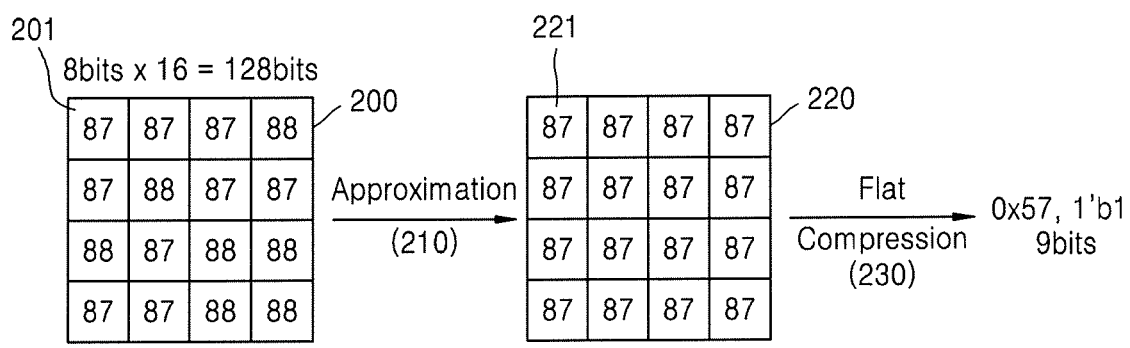
FIG. 2 is a diagram of an example of a texture compression method according to an exemplary embodiment of the inventive concept.

FIG. 2 is a diagram of an example of a texture compression method according to an exemplary embodiment of the inventive concept.

Although a texture 200 including all texture blocks 201 is defined in FIG. 2 for descriptive convenience, a person of ordinary skill in the art should understand that each of the texture blocks 201 may perform a function of the texture 200. For example, the texture blocks 201 may be images added to 3D objects on 3D images during a process of rendering the 3D objects as 3D images that are to be displayed and may include information about detailed shapes of the 3D objects, surface texture, colors, etc.

An example of the texture 200 prior to compression by a computing system is illustrated in FIG. 2. For example, the texture 200 may include 16 texture blocks 201 each including data of 8 bits. However, this configuration is exemplary. The texture 200 may include an arbitrary number of texture blocks 201, and each texture block may include data of an arbitrary number of bits.

Numbers 87 and 88 on the texture blocks 201 may correspond to the data of 8 bits each including information about a corresponding shape, surface texture, and a color.

For an example of loss compression, a loss of data corresponding to the lower 2 bits may occur when the computing system compresses texture. In this example, if each texture block includes 9 bits, and the lower 2 bits (e.g. the two least significant bits) may be lost. Texture blocks 87 and 88 shown in texture 200 have a difference of less than the lower 2 bits, and thus both 87 and 88 may be approximated (210) to 87. An approximated texture 220 may include 16 texture blocks all having a data value of 87.

Thus, if the computing system compresses (230) the approximated texture 220, the compressed texture may be expressed as 8 bits of 0x57 meaning 87 and 1 bit indicating that the 16 texture blocks 221 have the same value. For example, data of 128 bits may be compressed as data of 9 bits with a high compressibility through the loss compression.

As described above, the loss compression may generally be used to obtain a relatively high amount of compressibility (as opposed to a lossless compression which has a relatively low amount of compressibility). Loss that occurs during the loss compression may employ a part of a calculation error allowed during a texture filtering process. If compressibility increases, since a size of compressed data is reduced, the power consumed to read/write the compressed data may be reduced when compared with the power consumed to read/write uncompressed data.

Referring back to FIG. 1, in operation 110, the computing system may determine a second data loss amount that is allowable during a texture filtering process based on the obtained information.

Texture filtering refers to a process of interpolating adjacent points for an output corresponding to a decimal coordinate on a space based on texture data having information about an integer coordinate. For example, a color of a texture mapped pixel may be determined using the colors of texels that are close by. Texture that is a resultant of a texture filtering process may allow for an amount of error that is difficult to be recognized by human eyes. The computing system may perform texture filtering having the allowed error to reduce hardware costs and power consumption. Thus, if interpolation is performed, some data loss may occur. Also, since various interpolation methods may be performed, different data loss amounts may occur in the performance of various interpolation methods.

The computing system may receive the information about the first data loss amount that occurs during a texture compression process, and may determine the second data loss amount that is allowable (e.g. permitted) during the texture filtering process based on the received information. Although texture compression and texture filtering are independent processes, the computing system may determine the allowable data loss during the texture filtering process by taking into account data loss that occurs during the texture compression process.

One way the computing system may determine the second data loss amount based on the information about the first data loss amount, is by using a reference for a data loss amount allowed during texture processing.

Accordingly, the computing system may receive information about the third data loss amount allowed during texture processing. The third data loss amount may refer to, for example, a maximum allowable loss amount by which an image corresponding to texture processed by the computing system may not look awkward (e.g. flawed) to human eyes.

The computing system may determine the second data loss amount based on a difference between the third data loss amount and the first data loss amount. For example, it is assumed that a texture format is a 16-bit long integer. When a data loss of the lower 4 bits is allowed during texture processing, and data loss corresponding to lower 3 bits occurs during the texture compression process, the computing system may determine the data loss that is allowable during the texture filtering process as being the lower 3 bits.

Through the above-described determination of data loss that is allowable, the computing system may maintain the precision of an image corresponding to texture more than a certain degree and may utilize a part of a calculation error allowed during the texture filtering process in the texture compression process, thereby obtaining high compressibility and reducing power consumption associated with, for example, writing into storage, reading back from storage and processed for display.

The third data loss amount may be determined based on at least one of characteristics of an image corresponding to texture, characteristics of an application, a texture format, and a user input. As an example, when the image corresponding to texture is realized with relatively high precision, the third data loss amount may be relatively small, and when the image corresponding to texture is realized with relatively low precision, the third data loss amount may be relatively large.

As another example of the inventive concept, when the texture format includes a relatively large amount of data, even if the data loss is higher than that when the texture format does not include a relatively large amount of data, since a loss ratio is not high overall, the third data loss amount may be relatively large. For example, the third data loss amount may be relatively larger when the texture format is the 16-bit NORM than when the texture format is the 8-bit NORM.

As another example of the inventive concept, the third data loss amount may be determined based on the user input. When a user desires to display a highly precise image on a screen, the third data loss amount may be determined to be small, and vice versa.

Also, the third data loss amount may be determined based on the characteristics of the application that displays an image on the screen by using texture. The third data loss amount may be determined to be relatively smaller in an application having an image rendered with relatively higher precision than an application with an image rendered with a relatively lower precision. Methods of determining the third data loss amount allowed during texture processing may vary and are not limited to the above-described examples.

Also, the computing system may generate a table including the information about the third data loss amount. In addition, the computing system may update an existing loss table about the third data loss amount.

FIG. 3 is a diagram of examples of loss tables 300 and 305 according to an exemplary embodiment of the inventive concept.

A third data loss amount is a data loss amount that is allowed during texture processing and may be different according to characteristics of texture or characteristics of an image corresponding to texture. Thus, at least one processor of a computing system may generate a loss table based on information about the amount of third data loss according to the characteristics of texture or the characteristics of the image corresponding to texture.

In this regard, the loss table may refer to a table including the information about the third data loss amount. For example, the loss tables 300 and 305 may include information about an allowed loss amount 320 according to a texture format 310 among the characteristics of texture. More specifically, the texture format 310 may be determined according to a bit width and a number system. The loss table can be sent, for example, to the texture unit, or for example, pointer information could be sent to permit access of the data in the loss table.

For example, in the loss table 300, when the texture format 310 is an 8-bit NORM, a loss of 2 bits (e.g. 2 lower bits) may be allowed, when the texture format 310 is a 16-bit NORM, a loss of 3 bits (e.g. 3 lower bits) may be allowed, when the texture format 310 is a 16-bit integer, a loss of 3 bits (e.g. 3 lower bits) may be allowed, and when the texture format 310 is a 32-bit floating point, a loss of 5 bits (e.g. 5 lower bits) may be allowed. In this regard, an allowed loss may be the number of lower bits that may be disregarded for approximation during a compression process, such as described with reference to FIG. 2 above.

As a size of texture data increases, a size of bits corresponding to the allowed loss amount 320 may also increase. For example, as shown in the loss table 300, when the texture format 310 is the 8-bit NORM, only the loss of 2 lower bits may be allowed, whereas, when the texture format 310 is the 16-bit NORM, the loss of 3 lower bits may be allowed since the size of texture data increases and, an error due to lower bits may be reduced.

Also, the loss tables 300 and 305 may have different values according to the characteristics of the image corresponding to texture. For example, an image that is more precisely expressed may have a smaller allowed loss amount than that of an image that is not more precisely expressed. The more precise expression may be a level of detail of the image. For example, an image having a complex pattern that may have a smaller allowed loss amount than image with a simple pattern. Upon comparing the loss table 300 with the loss table 305 of FIG. 3, the loss table 305 may have a greater allowed loss amount by 1 bit with respect to the texture format 310. Thus, in the case of the image that may be more precisely expressed, an allowed loss amount may be determined according to the loss table 300, and otherwise, the allowed loss amount may be determined according to the loss table 305.

The above-described allowed loss amounts of the loss tables 300 and 305 are provided as examples and may be differently set according to characteristics of an application or a user input. Methods of determining the loss tables 300 and 305 may vary and are not limited to the above-described examples.

Referring back to FIG. 1, in operation 120, the computing system may perform texture filtering by using the second data loss amount.

The computing system may perform texture filtering for the occurrence of loss that does not exceed the second data loss amount. The computing system may adjust the loss that occurred during the texture filtering process in various ways. The data loss amounts of the first data loss and the third data loss are factors in determining the second data loss amount.

The computing system may determine an interpolation method used in texture filtering and may perform texture filtering by using the determined interpolation method. Examples of the interpolation method may include point filtering, linear filtering, bilinear filtering, tri-linear filtering, anisotropic filtering, mipmap filtering, etc. Since different data loss amounts occur according to different interpolation methods, the computing system may adjust the loss that occurred during the texture filtering process according to a selection of a particular interpolation method.

Also, the computing system may adjust the loss by determining a data calculation range used for interpolation. For example, assuming that texture is filtered through linear interpolation, the linear interpolation may be performed according to the following Equation 1.

$$LERP = T10*(1-Wu) + T11*Wu \qquad \text{[Equation 1]}$$

In Equation 1, LERP denotes a linearly filtered value, T10 and T11 respectively denote a first texel color value and a second texel color value that are included in texture, and Wu denotes a weight used in linear interpolation.

With reference to equation 1, it is assumed that T10 and T11 are data of 16 bits, and Wu is data of 8 bits. Then, LERP may be data of 25 bits. In this case, if a data loss allowable during a texture filtering process is the lower 4 bits, the computing system may calculate the linearly filtered value by disregarding the lower 4 bits of T10 and T11. Also, according to another embodiment of the inventive concept, the computing system may calculate the linearly filtered value by disregarding the lower 4 bits of Wu.

Even though interpolation is performed by disregarding the lower bits of a first and second texel color value, or a weight used in, for example, linear interpretation, if the precision of an image corresponding to texture is not greatly reduced, the computing system may perform texture filtering by regarding the disregarded lower bits as an allowable loss amount.

For example, the computing system may take into consideration of a loss amount that occurred during a texture compression process and a loss amount that occurred during a texture filtering process, thereby reducing power consumption for writing and reading to/from storage and maintaining the precision of an image corresponding to texture more than a certain degree.

Figure 4:
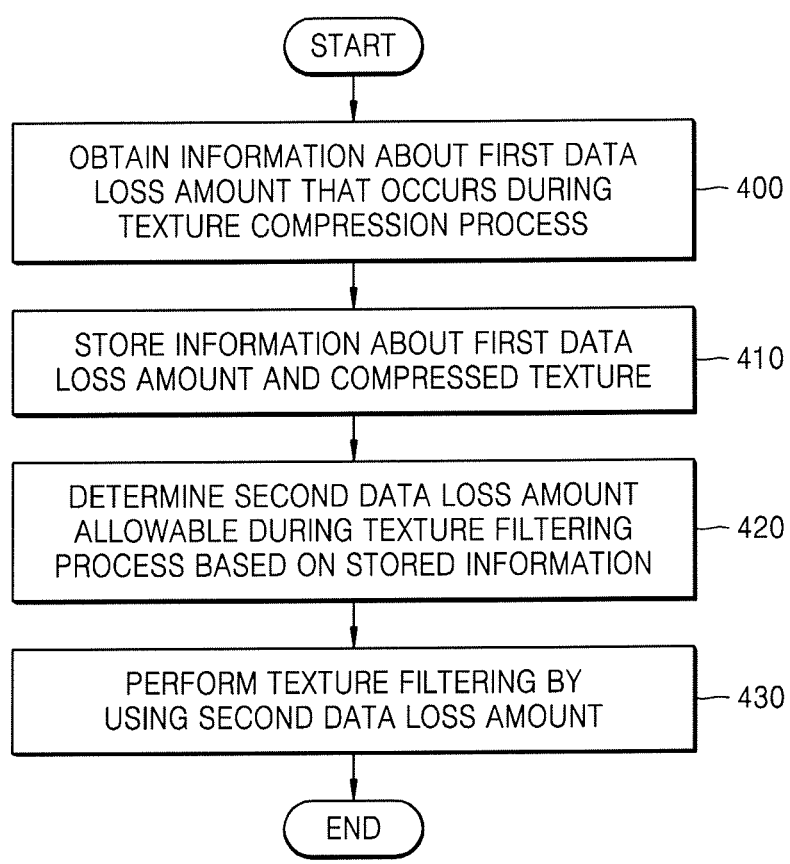
FIG. 4 is a flowchart of another example of a texture processing method according to an exemplary embodiment of the inventive concept.

FIG. 4 is a flowchart of another example of a texture processing method according to an exemplary embodiment of the inventive concept.

Referring to FIG. 4, in operation 400, a computing system may obtain information about a first data loss amount that occurs during a texture compression process. Operation 400 of FIG. 4 may be the same as operation 100 of FIG. 1. Thus, a detailed description of operation 400 is not repeated here. However, an artisan understands and appreciates that the information obtained about a first data loss amount that occurs during a texture compression process could have some variation from the discussion of the operation FIG. 1, for example, base on the type of compression preformed.

In operation 410, the computing system may store the information about the first data loss amount and the compressed texture. For example, the computing system may write in a memory the information about the first data loss amount and the compressed texture in a memory.

The computing system may store the information about the first data loss amount together with the compressed texture. For example, the computing system may store the compressed texture including the information about the first data loss amount in a metadata format.

As an example of the inventive concept, the information about the first data loss amount may include loss amount information about each compression unit of the compressed texture. In general, since a memory often has a high storage capacity, storing the loss amount information about each compression unit of the compressed texture in the memory should be a routine operation.

As another example of the inventive concept, the information about the first data loss amount may include information about an accumulated loss amount of a preset number of texture compression units. For example, the information about the first data loss amount may include information about an accumulated loss amount of 16 texture compression units. In this regard, the first data loss amount may be a value obtained by summing loss amounts of first through sixteenth compression units. A person of ordinary skill in the art should understand and appreciate that with regard to the accumulated loss amount, the preset number of texture compression units may be a portion of the total of texture compression units, or possibly all of the texture compression units.

With continued reference to FIG. 4, in operation 420, the computing system may be configured to determine a second data loss amount allowable during a texture filtering process based on the stored information. The stored information may be, for example, the compressed texture and the information about the first data loss amount that are stored in the memory, which may be decompressed by a decompressor. Decompressed data may be transmitted to a texture unit.

The computing system may be configured to determine the second data loss amount allowable during the texture filtering process based on the information transmitted to the texture unit. Operation 420 of FIG. 4 may be the same as operation 110 of FIG. 1. Thus, a detailed description of operation 420 will not be repeated here.

In operation 430, the computing system may perform texture filtering by using the second data loss amount. Operation 430 of FIG. 4 may be the same or a similar as operation 120 of FIG. 1. Thus, a detailed description of operation 430 is not repeated here.

Figure 5:
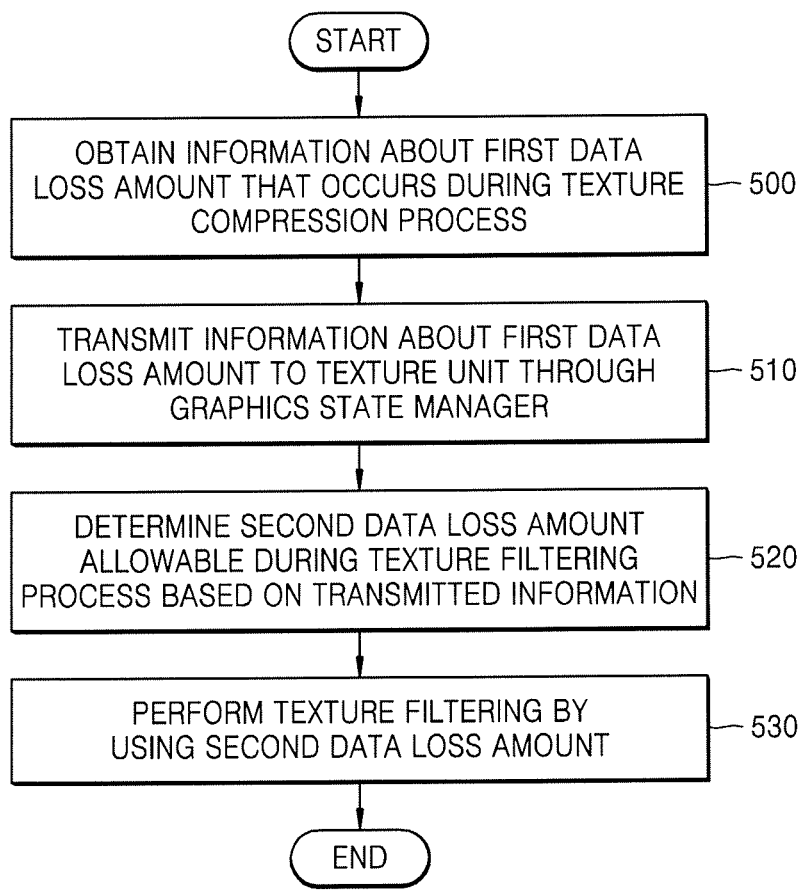
FIG. 5 is a flowchart of another example of a texture processing method according to an exemplary embodiment of the inventive concept.

FIG. 5 is a flowchart of another example of a texture processing method according to an exemplary embodiment of the inventive concept.

Referring to FIG. 5, in operation 500, a computing system may obtain information about a first data loss amount that occurs during a texture compression process. Operation 500 of FIG. 5 may be the same or a similar as operation 100 of FIG. 1. Thus, a detailed description of operation 500 is not repeated here.

Figure 6:
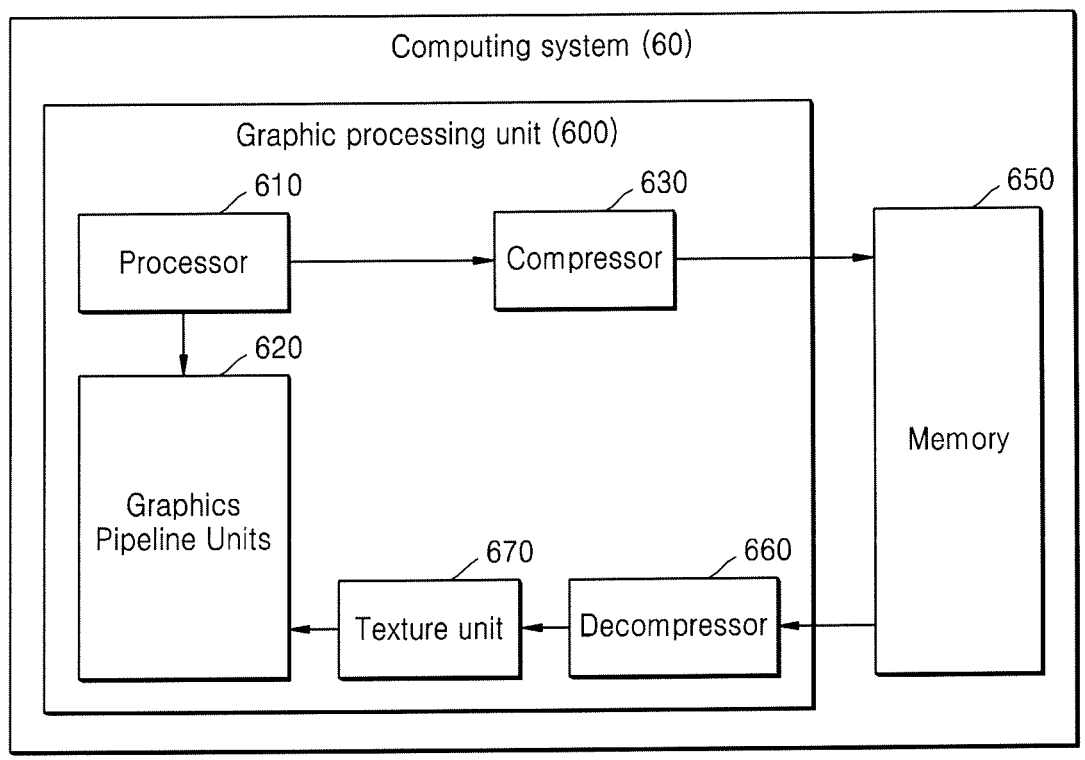
FIG. 6 is a block diagram of a structure of a computing system that processes texture, according to an exemplary embodiment of the inventive concept.

In operation 510, the computing system may transmit the information about the first data loss amount to a texture unit through a graphics state manager. The texture unit, such as shown in FIG. 6, may be arranged within the graphics processing unit. Unlike the description with reference to FIG. 4 above, the computing system may not store the information about the first data loss amount in a memory but may directly transmit the information about the first data loss amount to the texture unit that performs texture filtering through the graphics state manager. The graphics state manager may also be arranged with in the graphics processing unit.

The graphics state manager may be a module, for example, (e.g. a hardware module, or code executed by a processor such as graphics processing unit) that manages information about characteristics of texture. The graphics state manager may manage texture state information indicating characteristics such as a texture format, a texture size, whether texture is compressed, etc. Also, the graphics state manager may manage the texture state information by adding the information about the first data loss amount thereto.

In addition, the graphics state manager may transmit the texture state information to the texture unit, and that the texture unit may acknowledge receipt of the texture state information. Such information may include information about the texture compression process. During this process, the texture unit may obtain the information about the first data loss amount that occurs during the texture compression process.

The information about the first data loss amount may not include information about a loss amount of each texture compression unit but may include information about an accumulated loss amount of a preset number of texture compression units.

When the information about the first data loss amount is transmitted to the texture unit through the graphics state manager, the graphics state manager may not manage the information about the loss amount of each texture compression unit due to a limited quantity of each texture compression unit. Thus, the graphics state manager may manage the information about the accumulated loss amount of the preset number of texture compression units.

In this case, although a size of the information about the first data loss amount is reduced, since granularity of the information about the first data loss amount deteriorates, an elaborate loss adjustment may be difficult during a texture filtering process.

In operation 520, the computing system may determine a second data loss amount allowable during the texture filtering process based on the transmitted information. Operation 520 of FIG. 5 may be the same as described hereinabove regarding operation 110 of FIG. 1. Thus, a detailed description of operation 520 will not be repeated here.

In operation 530, the computing system may perform texture filtering by using the second data loss amount. Operation 530 of FIG. 5 may be the same as described hereinabove regarding operation 120 of FIG. 1. Thus, a detailed description of operation 530 will not be repeated here.

FIG. 6 is a block diagram of a structure of a computing system 60 that processes texture, according to an exemplary embodiment of the inventive concept.

Referring to FIG. 6, the computing system 60 may include integrated circuitry such as a graphics processing unit (GPU) 600 and a memory 650. Also, the GPU 600 may include a processor 610, one or more graphics pipeline units 620, a compressor 630, a decompressor 660, and a texture unit 670.

The GPU 600 may include a device performing a graphics pipeline and may correspond to a graphics exclusive processor. A rendering pipeline may be mapped onto graphics acceleration hardware, and may be input to the GPU, for example, in the form of vertices. The GPU 600 may be hardware implemented to perform a 3D graphics pipeline that may include a series of instructions so as to render 3D objects on a 3D image as 2D images that are to be displayed. For example, the GPU 600 may perform various functions such as shading, blending, and illuminating and various functions for generating pixel values with respect to pixels that are to be displayed. The GPU 600 may perform tile-based graphics pipeline for tile-based rendering (TBR).

The memory 650 may be hardware for storing various pieces of data processed in the computing system 60 and may store, for example, pieces of data that are processed and are to be processed by the GPU 600. Also, the memory 650 may store applications, drivers, etc. that are to be driven by the GPU 600. The memory 650 may include random access memory (RAM) such as dynamic random access memory (DRAM), static random access memory (SRAM), etc. read-only memory (ROM), electrically erasable programmable read-only memory (EEPROM), CD-ROM, blue-ray, or other optical disk storage, hard disk drive (HDD), solid state drive (SSD), etc. Furthermore, the memory 650 may include other external storage devices that are accessible to the computing system 60.

The processor 610 includes hardware that may be configured to control all operations so the GPU 600 may perform graphics pipeline operations. Also, the processor 610 may control the graphics pipeline units 620, the compressor 630, the decompressor 660, and the texture unit 670 to perform operations. The processor may be embodied as more than one processor, and may include integrated circuitry configured for operation. The processor may comprise a microprocessor.

The compressor 630 may obtain information about a first data loss amount that occurred during a texture compression process.

The compressor 630 may compress dynamic texture before storing the dynamic texture in the memory 650. Data loss may occur during the texture compression process, which may be by design, in that the compression process may disregard, for example, one or more lower bits. If an amount of data loss that occurs during the texture compression process is the first data loss amount, the compressor 630 may obtain the information about the first data loss amount.

The compressor 630 may receive information about a third data loss amount allowed during texture processing. Since human eyes do not sense an error below a certain degree when viewing an image corresponding to texture, such error may not pose a problem if there is less than a certain amount of data loss during texture processing. If a data loss amount allowed during texture processing is the third data loss amount, the compressor 630 may receive the information about the third data loss amount.

The compressor 630 may receive the third data loss amount from an external processor or driver but is not limited thereto. The processor 610 may determine the third data loss amount for itself. The compressor 630 may receive the information about the third data loss amount from the processor 610. Also, the compressor 630 may obtain the information about the third data loss amount based on a user input.

The compressor 630 may compress texture for the occurrence of data loss that does not exceed the third data loss amount. For example, the compressor 630 may compress texture by using various compression methods that cause the data loss that does not exceed the third data loss amount and may select a compression method that causes the least data loss amount from the compression methods.

The compressor 630 may generate a table including the information about the third data loss amount.

With continued reference to FIG. 6, the memory 650 may store the information about the first data loss amount and compressed texture. For example, the memory 650 may store the compressed texture including the information about the first data loss amount in a metadata format.

The decompressor 660 may obtain and decompress the information about the first data loss amount and the compressed texture that are stored in the memory 650. Also, the decompressor 660 may transmit the decompressed texture and information about the first data loss amount to the texture unit 670 that performs texture filtering.

The texture unit 670 may obtain the information about the first data loss amount from the decompressor 660 and may determine a second data loss amount allowable during the texture filtering process based on the obtained information. Although texture compression and texture filtering are independent processes, the texture unit 670 may receive the first data loss amount that occurred during the texture compression process and may determine an allowable loss amount during the texture filtering process to prevent an overall loss from adversely impacting display of the image. The allowable loss amount during the texture filtering process may be referred to as the second data loss amount.

One way the texture unit 670 may determine the second data loss amount based on the information about the first data loss amount, may be to utilize a reference for a data loss amount allowed during an entire texture processing operation.

Accordingly, the texture unit 670 may receive information about the third data loss amount allowed during texture processing. The third data loss amount may refer to a maximum allowable loss amount by which an image corresponding to texture processed by the computing system 60 may not look awkward to human eyes. Such awkwardness could be based on, for example, the alignment of certain lines displayed, for example.

The texture unit 670 may determine the second data loss amount based on a difference between the third data loss amount and the first data loss amount. For example, the texture unit 670 may determine a value by subtracting a data loss amount that occurred during the texture compression process from a data loss amount allowed during texture processing to obtain an allowable data loss amount that may occur during the texture filtering process.

Through the above-described determination of the second data loss amount, the texture unit 670 may maintain precision of an image corresponding to texture more than a certain degree, thereby obtaining high compressibility and reducing power consumed during texture processing.

The texture unit 670 may generate a table including the information about the third data loss amount. The table including the information about the third data loss amount may be referred to as a loss table, as shown in FIG. 3.

The third data loss amount may be determined based on at least one of the characteristics of an image corresponding to texture, the characteristics of an application, a texture format, and a user input.

The texture unit 670 may perform texture filtering by using the second data loss amount. The texture unit 670 may perform texture filtering for the occurrence of a loss that does not exceed the second data loss amount. The texture unit 670 may adjust the loss that occurred during the texture filtering process in various ways.

The texture unit 670 may determine an interpolation method used in texture filtering and may perform texture filtering by using the determined interpolation method. Since different data loss amounts occur according to various interpolation methods, the texture unit 670 may adjust the loss that occurred during the texture filtering process by selecting an interpolation method.

Also, the texture unit 670 may adjust the loss by determining a data calculation range used for interpolation. For example, the texture unit 670 may take into consideration a loss amount that occurred during the texture compression process and a loss amount that occurred during the texture filtering process, thereby reducing power consumption and maintaining precision of an image corresponding to texture more than a certain degree so that it is noticeable to a user.

Figure 7:
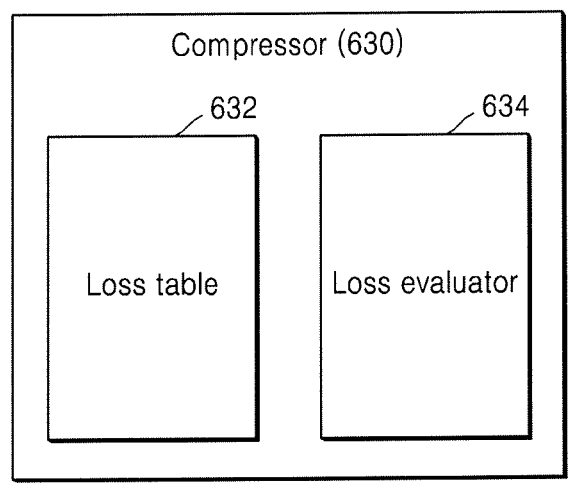
FIG. 7 is a block diagram of a structure of a compressor according to an exemplary embodiment of the inventive concept.

FIG. 7 is a block diagram of a structure of the compressor 630 according to an exemplary embodiment of the inventive concept.

Referring now to FIG. 7, the compressor 630 may include a loss evaluator 634 in addition to a texture compressing module. Also, the compressor 630 may receive or access a loss table 632 from a memory, or may store the loss table 632 in an internal space of the compressor 630. The processor 610 may control the loss evaluator 634 included in the compressor 630.

The compressor 630 may generate and store a table including information about a third data loss amount as the loss table 632. The loss table 632 may be referred to as a table including the information about the third data loss amount. Also, the compressor 630 may receive the table including the information about the third data loss amount from the memory. Moreover, an example of the loss table 632 is shown in FIG. 3.

The loss table 632 may provide a reference for an allowable data loss amount during a texture compression process. The allowable data loss amount during the texture compression process may be different according to the characteristics of texture, and/or the characteristics of an image corresponding to the texture. Accordingly, the loss table 632 may include the information about the third data loss amount according to the characteristics of texture or the characteristics of the image corresponding to the texture.

The loss evaluator 634 may quantize the first data loss amount that occurred during the texture compression process. One way the first data loss amount may be quantized is by the loss evaluator 634 determining in which range data loss is evaluated.

For example, a loss amount with respect to a texture compression unit may be referred to the first data loss amount. According to an embodiment of the inventive concept, an accumulated loss amount of a preset number of texture compression units may be referred to as the first data loss amount. The texture compression unit may be determined based on a cacheline size.

If a range for determining the first data loss amount is determined as described above, a loss amount corresponding to the range may be expressed. As an example, the loss amount may be expressed as a PSNR. For another example, the loss amount may be expressed in a root-mean-square error (RMSE), or a normalized mean square error (NMSE). As still another example, the first data loss amount may be calculated by taking into account hardware cost. When compression allowing loss corresponding to some lower bits is performed, the allowed loss amount may be the first data loss amount.

The loss evaluator 634 may be configured to quantize the first data loss amount, generate the information about the first data loss amount, and store the information about the first data loss amount and the compressed texture in the memory 650. Also, the loss evaluator 634 may transmit, for example, the generated information about the first data loss amount to a graphic state manager 680.

Figure 8:
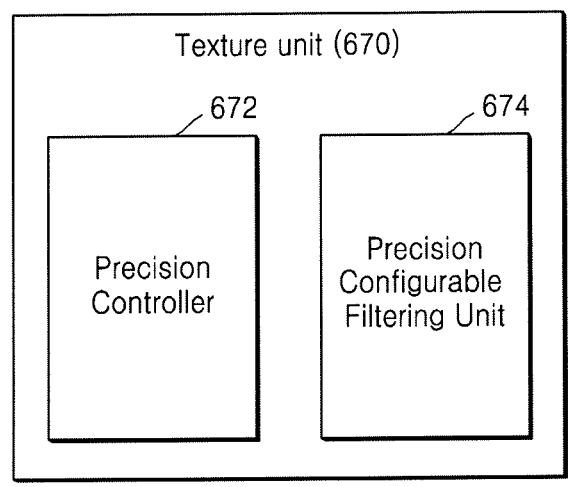
FIG. 8 is a block diagram of a structure of a texture unit according to an exemplary embodiment of the inventive concept.

FIG. 8 is a block diagram of a structure of the texture unit 670 according to an exemplary embodiment of the inventive concept.

Referring to FIG. 8, the texture unit 670 may include a precision controller 672 and a precision configurable filtering unit 674 in addition to a texture filtering module. The processor 610 may execute code to control the precision controller 672 and the precision configurable filtering unit 674 that are included in the texture unit 670.

The precision controller 672 may obtain information about a first data loss amount from the decompressor 660 and may determine a second data loss amount allowable during a texture filtering process based on the obtained information. Although texture compression and texture filtering are independent processes executed by the graphics processing unit, the precision controller 672 may determine the first data loss amount that occurred during the texture compression process and may use that information to determine an allowable loss amount during the texture filtering process.

One way the precision controller 672 may determine the second data loss amount based on the information about the first data loss amount a reference for a data loss amount allowed may be utilized during texture processing.

Accordingly, the precision controller 672 may receive and store information about a third data loss amount allowed during texture processing in a loss table. The third data loss amount may refer to a maximum allowable loss amount by which an image corresponding to texture processed by the computing system 60 may not look awkward to human eyes.

The precision controller 672 may also be configured determine a second data loss amount based on a difference between the third data loss amount and the first data loss amount. For example, the precision controller 672 may determine a value by subtracting a data loss amount that occurred during the texture compression process from a data loss amount allowed during texture processing as an allowable data loss during the texture filtering process.

Through the above-described determination, the precision controller 672 may maintain precision of an image corresponding to texture that is more than a certain degree, thereby obtaining high compressibility and reducing power consumed during texture processing.

The precision configurable filtering unit 674 may perform texture filtering by using the second data loss amount. The precision configurable filtering unit 674 may perform texture filtering for the occurrence of loss that does not exceed the second data loss amount. The precision configurable filtering unit 674 may adjust the loss that occurred during the texture filtering process in various ways.

The precision configurable filtering unit 674 may be configured to determine/select an interpolation method used in texture filtering and may perform texture filtering by using the determined interpolation method. Since different data loss amounts occur according to interpolation methods, the precision configurable filtering unit 674 may adjust the loss that occurred during the texture filtering process by selecting an interpolation method.

Also, the precision configurable filtering unit 674 may adjust the loss by determining a data calculation range used for interpolation. For example, the precision configurable filtering unit 674 may take into consideration a loss amount that occurred during the texture compression process and a loss amount that occurred during the texture filtering process, thereby reducing power consumption and maintaining precision of an image corresponding to texture more than a certain degree.

Figure 9:
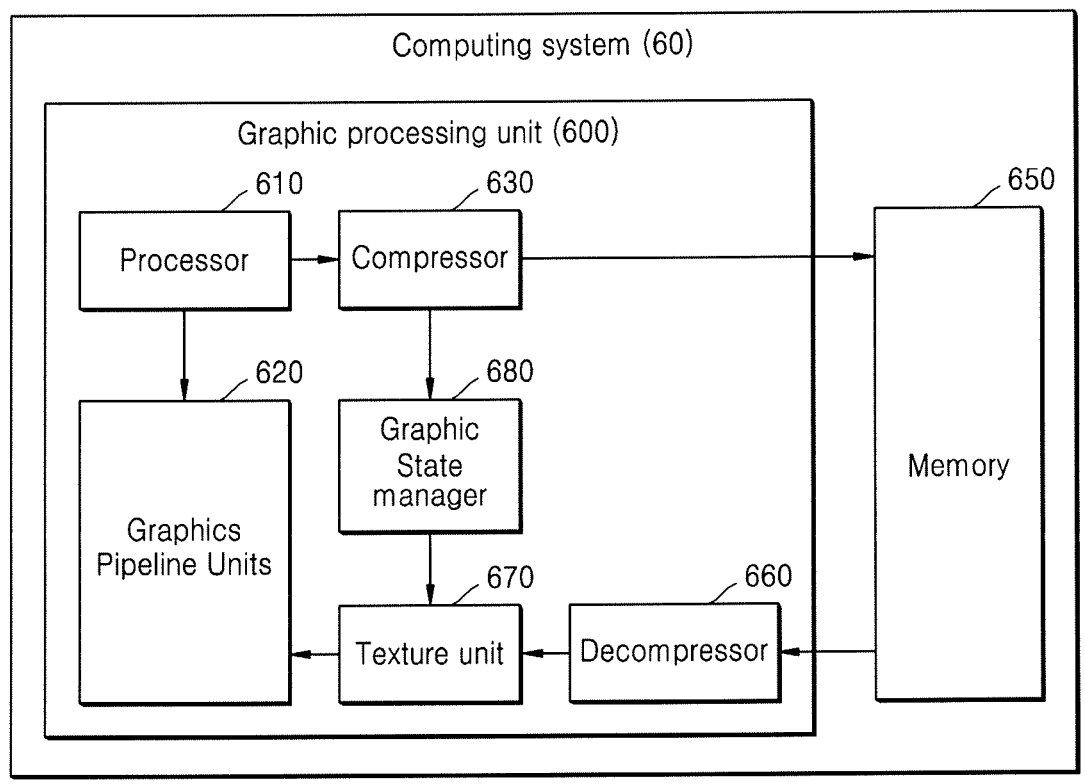
FIG. 9 is a block diagram of a structure of a computing system that processes texture, according to another exemplary embodiment of the inventive concept.

FIG. 9 is a block diagram of a structure of the computing system 60 that processes texture, according to an exemplary embodiment of the inventive concept.

Referring to FIG. 9, the computing system 60 may include, for example, the GPU 600 and the memory 650. Also, the GPU 600 may also include the graphics state manager 680, in addition to the processor 610, one or more graphics pipeline units 620, the compressor 630, the decompressor 660, and the texture unit 670.

The GPU 600, the processor 610, the graphics pipeline units 620, the compressor 630, the memory 650, the decompressor 660, and the texture unit 670 may be the same or similar to the description of in FIG. 6, and so their descriptions will not be repeated here.

The processor 610 may control the graphics state manager 680 to manage information about a texture state. For example, the processor 610 may control the graphics state manager 680 to transmit information about a first data loss amount to the texture unit 670.

The graphics state manager 680 may be realized as a module, which may be include hardware and/or execute machine instructions when executed may manage information about characteristics of the texture. The graphics state manager 680 may manage texture state information indicating, for example, characteristics such as a texture format, a texture size, whether textures is compressed, etc. Also, the graphics state manager 680 may manage the information about the first data loss amount to which the texture state information is added.

The graphics state manager 680 may transmit the texture state information to the texture unit 670 so that the texture unit 670 may acknowledge the texture state information. During this process, the texture unit 670 may obtain the information about the first data loss amount as part of or in addition to the texture state information.

The information about the first data loss amount may not include information about a loss amount of each texture compression unit but may include information about an accumulated loss amount of a preset number of texture compression units.

When the information about the first data loss amount is transmitted to the texture unit 670 through the graphics state manager 680, the graphics state manager 680 may not manage the information about the loss amount of each texture compression unit due to a limited quantity. Thus, the graphics state manager 680 may manage the information about the accumulated loss amount of the preset number of texture compression units.

In this case, although a size of the information about the first data loss amount is reduced, since granularity of the information about the first data loss amount deteriorates, an elaborate loss adjustment may be difficult during a texture filtering process.

The block diagrams of the computing system 60 of FIGS. 6 and 9 provide an understanding of an exemplary embodiment of the inventive concept, and are representative of structure that may be used to practice the texture processing method and device. For example, with regard to the graphic processing unit, the graphic pipeline units may operate in an embodiment in hardware to perform a series of instructions to render 3D objects on a 3D image as 2D images that are to be displayed. The GPU may operate as a type of stream processor in which all the stages may be used simultaneously to process respective fragments (or vertices). The components of the block diagrams may be integrated, added, or omitted according to the specification of the actually implemented computing system 60. For example, two or more components may be integrated into one component or one component may be split into two or more components. Also, functions performed in the block diagrams are for illustrating at least one example embodiment of the inventive concept, and the scope of the present disclosure is not limited by detailed operations or devices.

The method of the computing system may be a computer-implemented method including computer instructions which may be executed by, for example, a processor or microprocessor, and may execute various computer operations having executable code that may be recorded on a computer-readable recording medium. The computer-readable recording medium may include, for example, program commands, data files, data structures, or a combination thereof.

The inventive concept may be implemented in hardware, firmware or as software or computer code that is stored on a non-transitory machine-readable medium, so that the methods described herein are loaded into hardware such as a general-purpose processor, or a special processor or in programmable or dedicated hardware, such as an ASIC or FPGA. The program commands recorded on the computer-readable recording medium may be specially designed and constructed for the inventive concept or may be known to and usable by one of ordinary skill in a field of computer software. Examples of the computer-readable medium include but are not in any way limited to storage media such as magnetic media (e.g., hard discs, floppy discs, or magnetic tapes), optical media (e.g., compact disc-read only memories (CD-ROMs), or digital versatile discs (DVDs)), magneto-optical media (e.g., floptical discs), and hardware devices that are specially configured to store and carry out program commands (e.g., ROMs, RAMs, or flash memories). Examples of the program commands include a high-level language code that may be executed by a computer using an interpreter as well as a machine language code generated by a complier.

It should be understood that embodiments of the inventive concept described herein should be considered in a descriptive sense only and not for purposes of limitation. Descriptions of features or aspects within each embodiment should typically be considered as available for other similar features or aspects in other embodiments.

While one or more embodiments of the inventive concept have been described with reference to the figures, it will be understood by those of ordinary skill in the art that various changes in form and details may be made therein without departing from the spirit and scope as defined by the following claims.

What is claimed is:

1. A texture processing method performed by a computing system, the method comprising:
identifying a first data loss amount that occurred during a texture compression process;
receiving information about a third data loss amount that is allowed during texture processing, wherein the texture processing includes the texture compression process and a texture filtering process;

determining a second data loss amount that is allowable during the texture filtering process based on a difference between the third data loss amount that is allowed during texture processing and the first data loss amount that occurred during the texture compression process; and performing texture filtering by using the determined second data loss amount.

2. The texture processing method of claim 1, further comprising:

compressing texture to result in the first data loss that is less than the third data loss amount based on the received information.

3. The texture processing method of claim 1, wherein the third data loss amount that is allowed during texture processing is determined based on at least one of: characteristics of an image corresponding to texture, characteristics of an application, a texture format, and a user input.

4. The texture processing method of claim 1, further comprising:

generating a table comprising the received information about the third data loss amount.

5. The texture processing method of claim 1, further comprising: storing in a memory information about the first data loss amount and compressed texture.

6. The texture processing method of claim 1, further comprising: transmitting information about the first data loss amount that occurred during the texture compression process to a texture unit through a graphics state manager.

7. The texture processing method of claim 6, wherein the first data loss amount comprises information about an accumulated loss amount of a preset number of texture compression units.

8. The texture processing method of claim 1, wherein the performing of the texture filtering comprises:

determining an interpolation method used to perform texture filtering;

performing texture filtering by using the determined interpolation method; and adjusting for a loss that occurred during the texture filtering by selecting a particular interpolation method.

9. The texture processing method of claim 1, wherein the texture compressed by the texture compression process comprises a dynamic texture generated in real time during graphics processing, and further comprising storing in a memory information about the first data loss amount and the compressed dynamic texture.

10. A computing system that executes texture processing of texture data, the computing system comprising:

at least one memory;

a compressor that compresses texture data; and at least one processor connected with the memory, wherein the at least one processor is configured to:

obtain information about a first data loss amount that occurred during a texture compression process by the compressor, receive information about a third data loss amount that is allowed during texture processing, wherein the texture processing includes the texture compression process and a texture filtering process, determine a second data loss amount allowable during a texture filtering process based on a difference between the third data loss amount and the first data loss amount, and perform texture filtering by using the second data loss amount.

11. The computing system of claim 10, wherein the at least one processor compresses texture to have a data loss that occurs within the third data loss amount.

12. The computing system of claim 10, wherein the third data loss amount is determined based on at least one of characteristics of an image corresponding to texture, characteristics of an application, a texture format, and a user input.

13. The computing system of claim 10, wherein the at least one processor generates a loss table comprising the information about the third data loss amount.

14. The computing system of claim 10, wherein the at least one memory stores the information about the first data loss amount and compressed texture.

15. The computing system of claim 10, further comprising:

a graphics state manager configured to manage information about characteristics of the texture; and a texture unit configured to perform texture filtering, wherein the at least one processor is configured to transmit the information about the first data loss amount to the texture unit through the graphics state manager.

16. The computing system of claim 14, wherein the information about the first data loss amount comprises information about an accumulated loss amount of a preset number of texture compression units.

17. The computing system of claim 10, wherein the at least one processor determines an interpolation method used to perform texture filtering with a data loss amount based on the determined second data loss amount, performs texture filtering by using the determined interpolation method and adjusts for a loss that occurred during the texture filtering by selecting a particular interpolation method.

18. A non-transitory computer-readable recording medium having recorded thereon one or more computer programs for implementing the following operations:

identifying a combined data loss threshold for texture processing, wherein the texture processing includes a texture compression process and a texture filtering process;

identifying a compression data loss amount that occurred during the texture compression process;

determining a filtering data loss amount that is allowable during the texture filtering process based on a difference between the combined data loss threshold and the compression data loss amount; and performing texture filtering using the determined filtering data loss amount.

* * * * *